United States Patent

Braner et al.

[11] 3,861,536
[45] Jan. 21, 1975

[54] TRANSPORTING DEVICE FOR ITEMS OF COILED MATERIAL

[75] Inventors: Harold R. Braner, Chicago; William C. Jasinski, Arlington Heights; Douglas S. Matsunaga; Roy F. Lo Presti, both of Chicago, all of Ill.

[73] Assignee: Braner Engineering Inc., Chicago, Ill.

[22] Filed: July 19, 1973

[21] Appl. No.: 380,582

[52] U.S. Cl. .............................. 214/6 G, 214/6 BA
[51] Int. Cl. ........................................... B65g 57/00
[58] Field of Search ........................ 214/6 DK, 6 H

[56] References Cited
UNITED STATES PATENTS
2,565,927   8/1951   Morgan .............................. 214/6 H

FOREIGN PATENTS OR APPLICATIONS
969,527   9/1964   Great Britain ..................... 214/6 H Primary Examiner—Albert J. Makay
Assistant Examiner—Donald W. Underwood
Attorney, Agent, or Firm—Oltsch & Knoblock

[57] ABSTRACT

A transporting device for items of coiled material in which the individual items are carried by a conveyor member onto a separate conveyor section which is located under a handler. Each item of coiled material is stopped and located under the handler upon the conveyor section. The handler engages and supports the coiled material item while the conveyor section is shifted out from under the item. The handler then lowers the item of coiled material onto a depository where the item is transported to another location.

9 Claims, 13 Drawing Figures

TRANSPORTING DEVICE FOR ITEMS OF COILED MATERIAL

BACKGROUND OF THE INVENTION

This invention relates to a transporting device for items of coiled material and will have specific relation to a stacker for coils of slit metallic sheet material.

In the coil slitting and processing industry, large rolls of sheet material are unrolled and run through a slitter which serves to cut the sheet material into a plurality of smaller ribbon-like strips of selected widths. The slit strips are coiled, with each resulting coil being banded to produce an item of coiled material of selected width which can range in the case of steel from 200 to 6,000 pounds in weight, having an outer diameter of 24 to 60 inches and an inner diameter of 16 to 24 inches. Such coils, after being banded, are moved by conveyors onto a stacker which causes a selected number of the coils to be placed one on top of another on a turntable or similar depository means. From the depository means the stacked coils are moved onto a discharge conveyor where the coils can be weighed and processed for distributon. Heretofore, stackers for such coils were constructed so that each coil and the handling device for the coil were moved as a unit from the conveyor over to and lowered upon the turntable. This was a time-consuming process.

The stacker of this invention is constructed so as to be positionable in a permanent location over the turntable and includes a handler by which several coils of slit material can be supported at one time and lowered onto a turntable.

SUMMARY OF THE INVENTION

The transporting device which constitutes the broadest aspect of this invention is located at the discharge end of a conveyor member and over a depository means, such as a turntable. The conveyor member is used to transport items of coiled material to a horizontal conveyor section which constitutes a part of the transporting device and which is located at the discharge end of the conveyor member. A handler is positioned over the conveyor section and is utilized to engage and support the coiled material item which is brought to a stop upon the conveyor section. The conveyor section is then withdrawn from under the supported coiled material item and the item lowered by the handler onto the depository means. When desired, the handler can be utilized to stack several items of coiled material over the conveyor section and to lower the stacked items as a unit onto the depository means.

Accordingly, it is an object of this invention to provide a transporting device for items of coiled material in which such items can be transferred from a conveyor onto an underlying depository means such as a turntable.

Another object of this invention is to provide a stacker for coiled material in which individual items of coiled material can either be stacked one upon another and lowered as a unit onto a turntable, or be lowered individually and stacked one upon another on the turntable.

Still another object of this invention is to provide a transporting device for stacking items of coiled material in a time-saving, efficient manner.

Other objects of this invention will become apparent upon a reading of the invention's description.

2

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
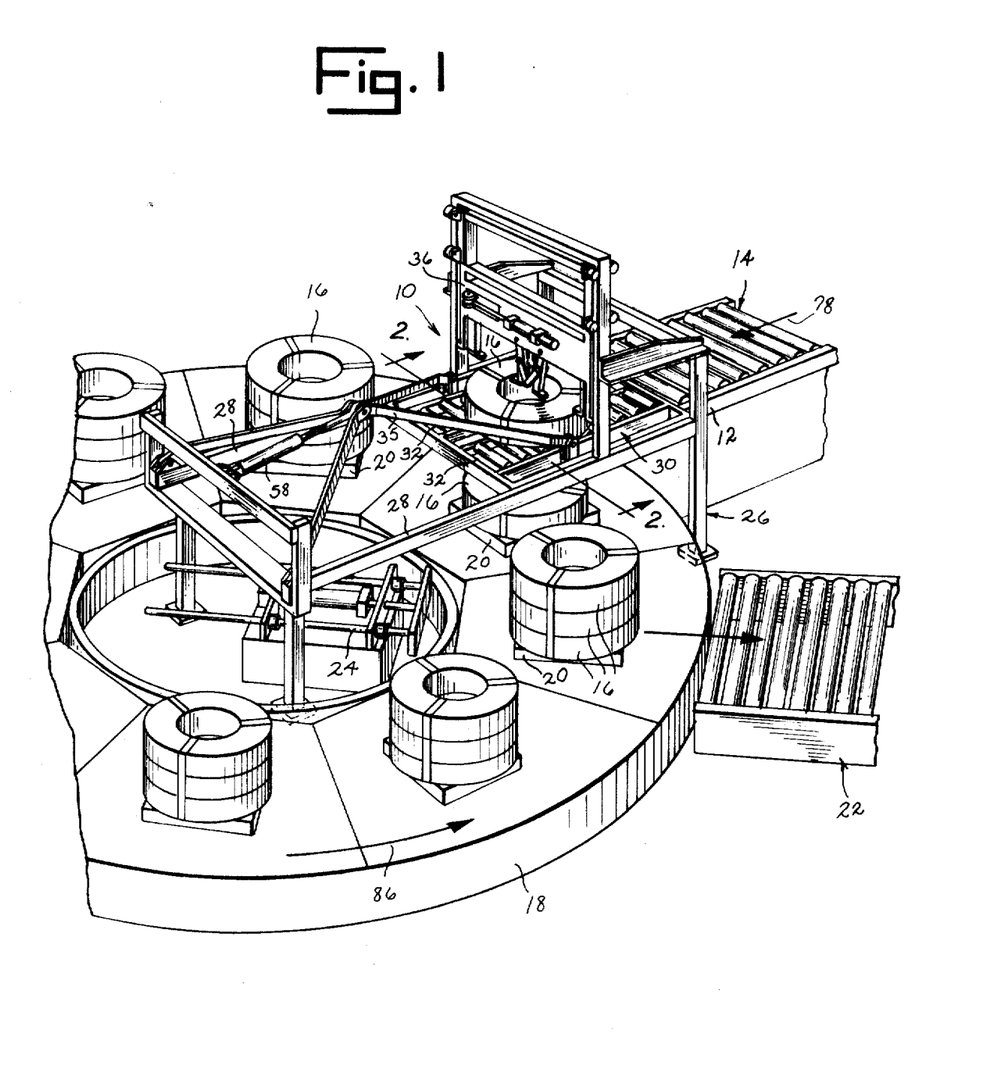
FIG. 1 is a perspective view of the transporting device being utilized as a stacker for coiled material in a coil slitting and processing line.

Referring to FIG. 1, transporting device 10 is shown positioned at the discharge end 12 of a conveyor member 14. Conveyor 14 constitutes an operable part of a coil slitting and processing line and may be of the power roller type which receives banded coils 16 of slitted steel material. Transporting device 10 is located over a depository, such as turntable 18. Coils 16 are stacked by transporting device 10 upon pallets 20 supported upon turntable 18 and are shifted upon rotation of the turntable into alignment with another conveyor member 22. A pusher 24 mounted within the open center of turntable 18 engages and pushes each pallet 20 and coils 16 stacked thereon onto conveyor 22 for further processing and distribution.

Figure 3:
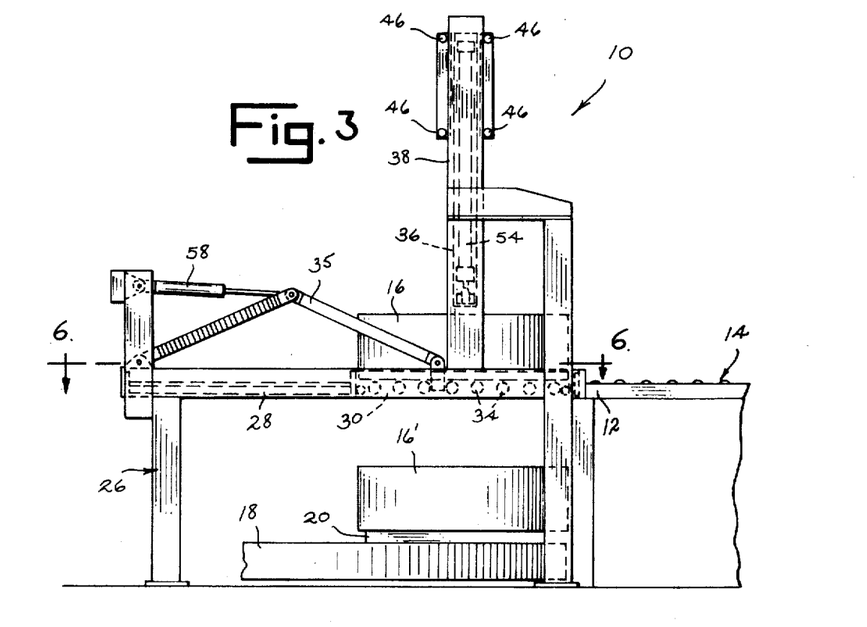
FIG. 3 is a side view of the transporting device shown in FIG. 1.
Figure 4:
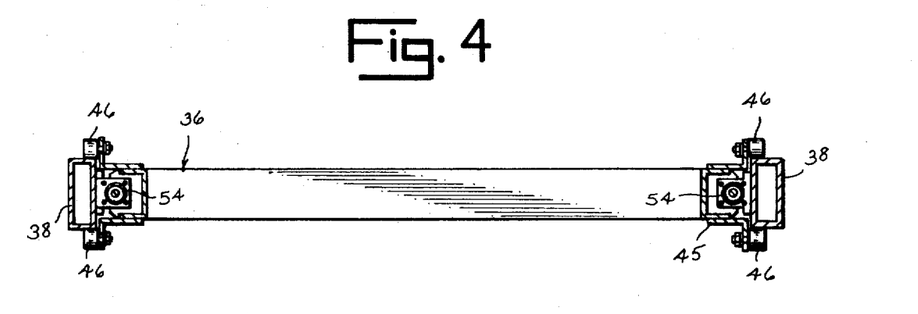
FIG. 4 is a fragmentary sectional view taken along line 4—4 of FIG. 2.
Figure 5:
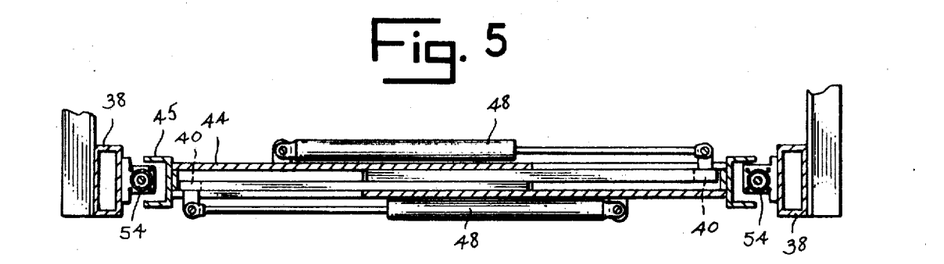
FIG. 5 is a fragmentary sectional view taken along line 5—5 of FIG. 2.
Figure 6:
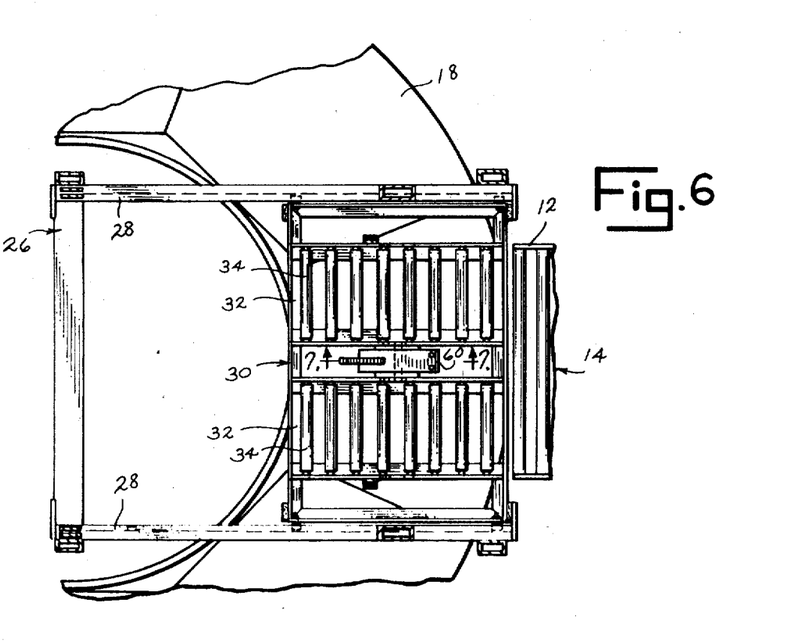
FIG. 6 is a fragmentary sectional view taken along line 6—6 of FIG. 3.

Transporting device 10 includes a frame 26 having spaced parallel longitudinal guide rails 28. Guide rails 28 are aligned with conveyor member 14 and support a shiftable conveyor section 30. Conveyor section 30, which includes laterally spaced banks 32 of rollers 34, is connected by linkage 35 to frame 26 and is shiftable in a substantially horizontal plane between a loading position shown in FIGS. 1, 3 and 6 and a discharge position shown in FIG. 12. When in its loading position shown in FIG. 1, conveyor section 30 is positioned at the same level as conveyor member 14 and forms a contiguous part of the conveyor system which enables a coil 16 to travel across conveyor 14 and onto conveyor section 30.

A coil handler 36 is supported for vertical shiftable movement between uprights 38 over turntable 18. Handler 36 is located over conveyor section 30 when the conveyor section is in its loading position. Handler 36 includes a pair of outside finger parts 40 and a pair of inside finger parts 42. Finger parts 40 and 42 are carried by a cross member 44 which is supported within a frame member 45 guided for vertical shiftable movement between uprights 38 by rollers 46. Each outside finger part 40 is operatively connected to a power cylinder 48 which may be of the pneumatic type and which upon actuation causes the finger part to be shifted laterally between uprights 38, as shown by the solid and broken line positions in FIG. 11. Inside finger parts 42 are pivotally connected at their upper ends to cross member 44 and are connected by linkage 50 to a power cylinder 52 which may also be of the pneumatic type. Power cylinder 52 causes finger parts 42 to be shifted between the solid and broken line positions shown in FIG. 11. Vertical shiftable movement of handler 36 between uprights 38 is controlled by a pair of power cylinders 54, best seen in FIG. 13, which are connected between uprights 38 and the frame member 45 which supports cross member 44. Movement of conveyor section 30 between its loading and discharge positions is controlled by a power cylinder 58, best seen in FIG. 1, which is connected between frame 26 and linkage 35. Power cylinders 54 may be of the hydraulic type while power cylinder 58 may be of the pneumatic type.

Figure 7:
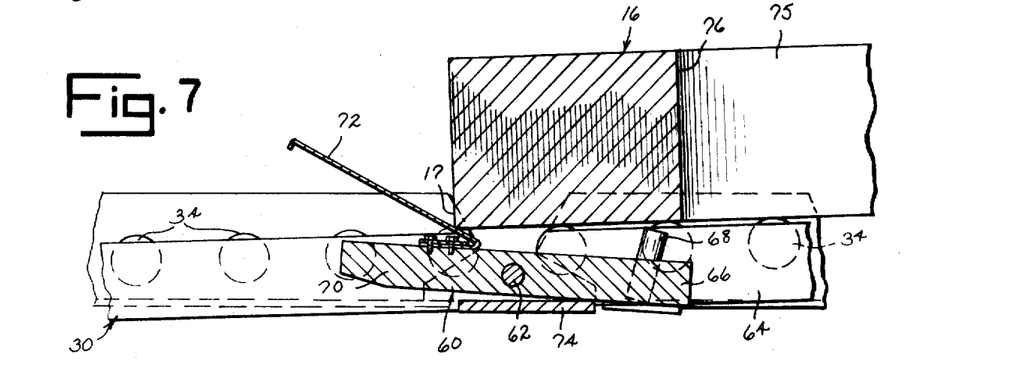
FIG. 7 is a sectional view taken along line 7—7 of FIG. 6 showing an item of coiled material entering upon the transporting device.
Figure 8:
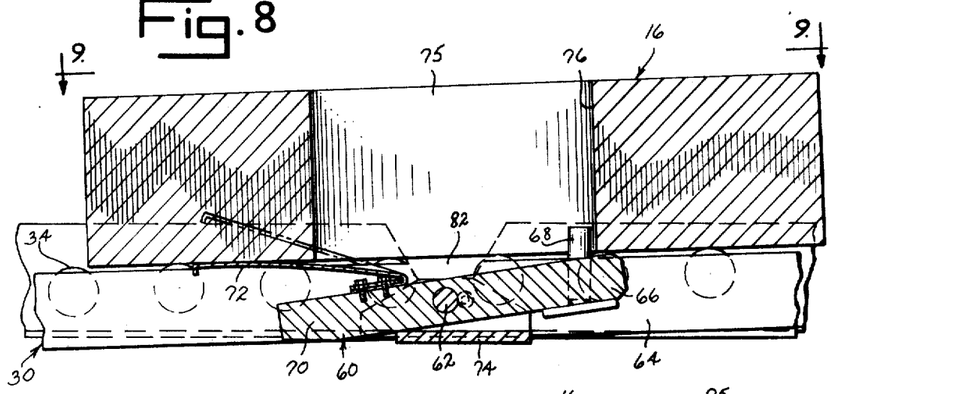
FIG. 8 is a fragmentary view of the transporting device of FIG. 7 showing the item of coiled material stopped and positioned upon the transporting device.
Figure 9:
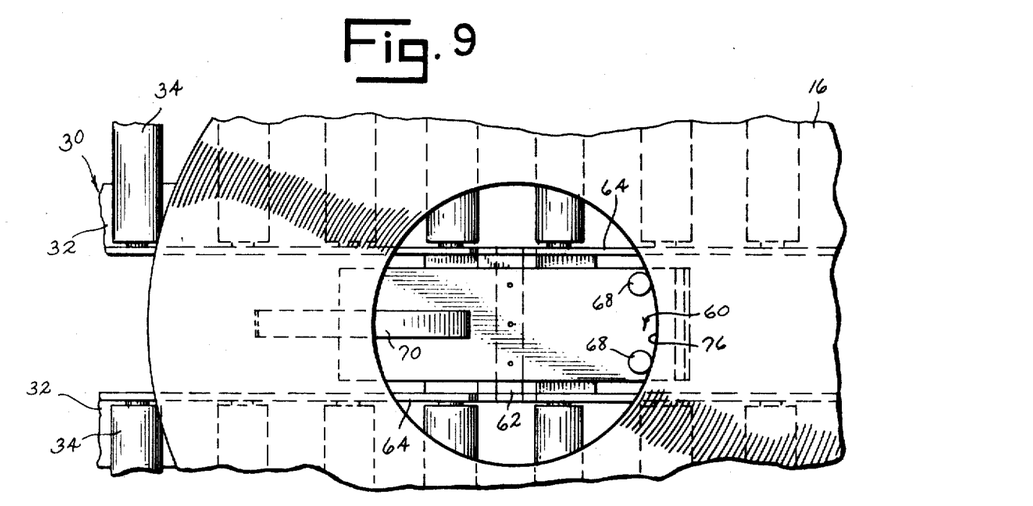
FIG. 9 is a fragmentary top plan view as seen along line 9—9 of FIG. 8.

A beam 60 is provided to stop and position individual coils 16 on conveyor section 30 as the coils travel from conveyor 14. Beam 60 is positioned between roller banks 32, preferably in the center of the conveyor section 30 and is pivotally supported between its ends by a transverse rod 62 which is journaled in inner side frames 64 of roller banks 32. Beam 60 is aligned with conveyor member 14 and is pivotal in a plane with rod 62 which generally parallels the direction of movement of coils 16 as they travel over conveyor member 14 onto conveyor section 30. It is to be understood that it will not be unusual for a coil 16 to be discharged from conveyor member 14 at a slight angle onto conveyor section 30 and it is for this reason that beam 60 and its plane of pivotal movement will seldom be in a precisely parallel relationship to the direction of travel of the coils. The end portion 66 of beam 60 which is positioned nearest to conveyor member 14 carries at least one and preferably two upwardly projecting pegs 68. The end portion 70 of beam 60 carries a flexible spring member 72. A transverse plate 74 extends adjacently under beam 60 between side frames 64 of conveyor section 30. End portion 66 of beam 60 is so weighted that the beam is normally located in the position shown in FIG. 7 with the tops of pegs 68 located below the level of rollers 34 of the conveyor section and with spring member 72 projecting above the level of the rollers. When in this position, beam 60 rests upon plate 74. As a coil 16 travels across discharge end 12 of conveyor member 14 onto conveyor section 30, it passes over beam 60 until contact of the leading edge 17 of the coil is made with spring member 72 as shown in FIG. 7. The rigidity of spring member 72 and the spacing between the spring member and pegs 68 are such that as coil 16 proceeds along conveyor section 30 it depresses the spring member and causes end portion 66 of the beam to swing upwardly with pegs 68 projecting into the opening 75 at the inner diameter 76 of the coil. The coil will proceed across beam 60 with spring member 72 remaining depressed and with pegs 68 of beam 60 projecting into the center opening 75 of the coil until the coil at its inner diameter 76 contacts pegs 68 and is stopped and pivotally centered relative to conveyor section 30, as shown in FIGS. 8 and 9.

Figure 2:
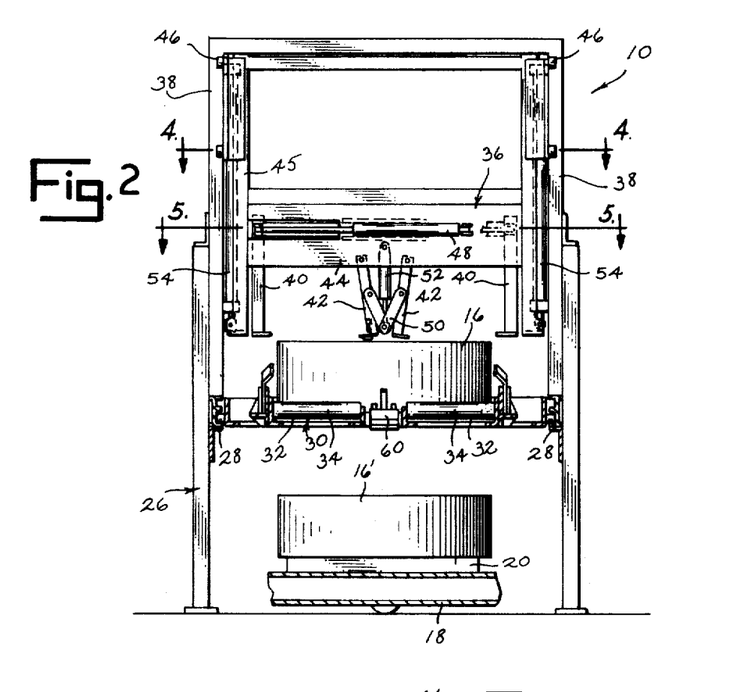
FIG. 2 is a sectional view of the transporting device as seen along line 2—2 of FIG. 1.
Figure 10:
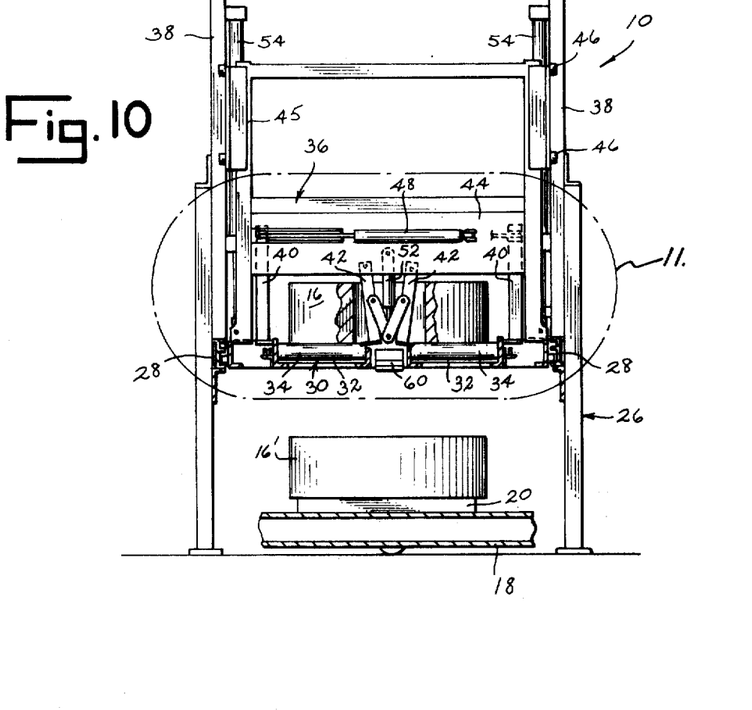
FIG. 10 is a sectional end view of the transporting device as shown in FIG. 2 but with portions of the device shown in sectional form and in a sequential operating position.
Figure 11:
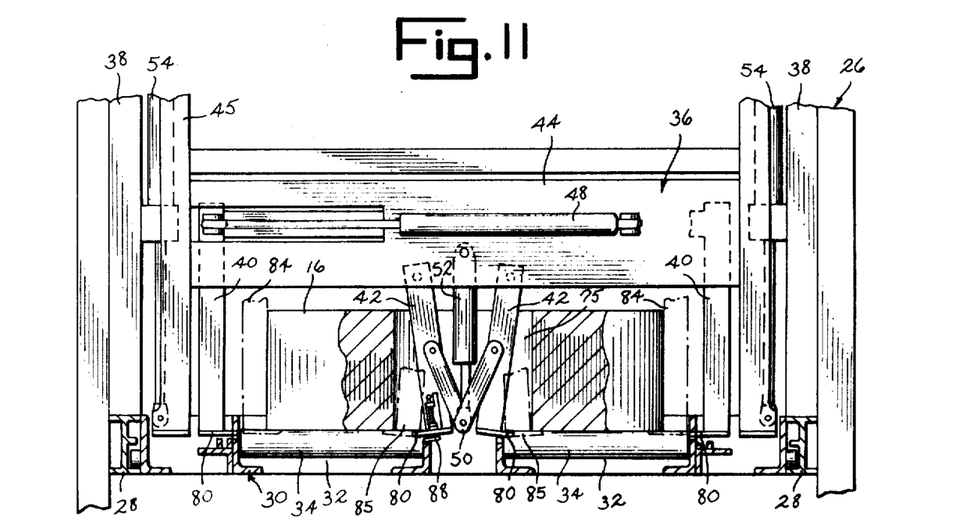
FIG. 11 is an enlarged view of that portion of FIG. 10 enclosed within broken line 11.

The method of operation of the transporting device 10 will now be described. A coil 16 proceeds down conveyor member 14 in the direction shown by arrow 78 in FIG. 1 with conveyor section 30 located in its loading position. Coil 16 slides off conveyor member 14 onto conveyor section 30 and over beam 60 which is positioned as shown in FIG. 7. As coil 16 progresses over beam 60, the beam is pivoted so as to position pegs 68 above the level of rollers 34 and in the center opening 75 of the coil where contact is made between the pegs and the inner diameter of the coil to locate and stop the coil in a generally centered position upon conveyor section 30. Power cylinder 58 used to shift conveyor section 30 into its loading position is under a constant pressure and acts to absorb a portion of the shock when coil 16 is stopped by pegs 68. Once the coil is stopped upon conveyor section 30, handler 36, which is in its raised position with finger parts 40 and 42 each retracted into the positions shown in FIG. 2, is lowered through the actuation of power cylinders 54 until flanges 80 of finger parts 40 and 42 are located slightly below the lower level of the coil as shown in FIGS. 10 and 11. Rollers 34 of conveyor section 30 are spaced sufficiently far apart and side frames 64 of conveyor section 30 notched at 82 to accommodate finger parts 40 and 42 and the locating of flanges 80 thereof below the coil. Power cylinders 48 and 52 are then simultaneously actuated to cause finger parts 40 and 42 to assume the respective broken line positions 84 and 85, illustrated in FIG. 11, for supporting coil 16. Power cylinders 54 are then again actuated to slightly lift coil 16 from conveyor section 30.

Figure 12:
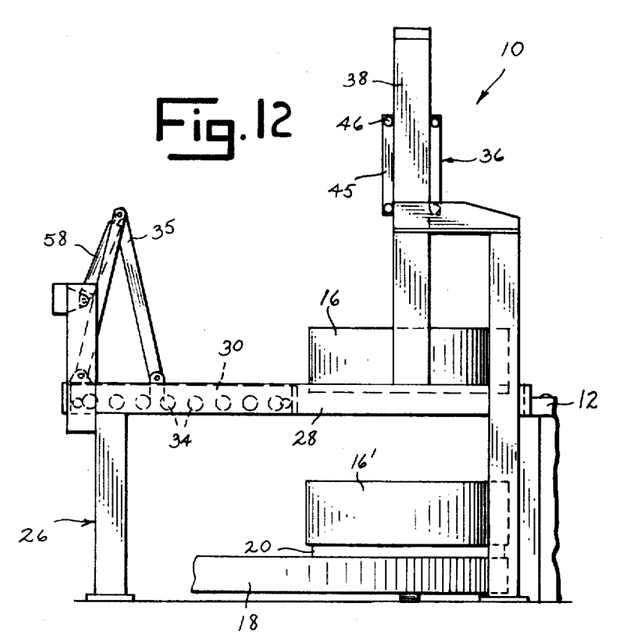
FIG. 12 is a side view of the transporting device shown in another sequential operating position.
Figure 13:
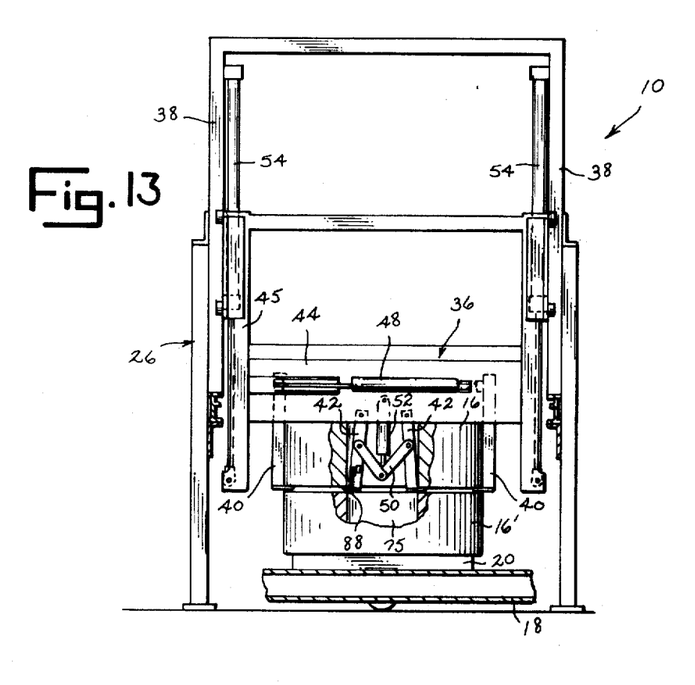
FIG. 13 is an end view of the transporting device shown in still another sequential operating position.

With coil 16 lifted from conveyor section 30, power cylinder 58 is actuated to shift the conveyor section from its loading position to its discharge position illustrated in FIG. 12. Handler 36 is then lowered through the actuation of power cylinders 54 to deposit coil 16 onto a pallet 20 or a previously deposited coil 16', as shown in FIG. 13, which is supported upon turntable 18. Turntable 18 can be rotated as shown by arrow 86 in FIG. 1 into position during the time the coil is supported upon conveyor section 30. As handler 36 approaches turntable 18, a pressure switch 88 carried by one of the inside finger parts 42 contacts either pallet 20 or coil 16', as the case may be, and causes power cylinders 48 and 52 to shift finger parts 40 and 42 into retracted positions and out of contact with the finger supported coil, thereby freeing the coil 16 which is caused to rest upon either pallet or coil 16'. Handler 36 is then raised and conveyor section 30 shifted from its discharge into its loading position to begin the transporting cycle for another coil 16 which is traveling across conveyor member 14 toward its discharge end 12. This loading sequence is repeated with selected stations on turntable 18 being positioned under handler 36 and with coils 16 being stacked one upon the other.

It is contemplated that in some constructions of this invention the rollers 34 of conveyor section 30 will be powered instead of the gravity type illustrated in the drawings so as to better locate and center the coils 16 thereon during the operation of beam 60. It may be desirable to lower more than one coil at a time onto turntable 18. In this situation, after finger parts 40 and 42 have engaged the coil supported upon conveyor section 30, power cylinders 54 will be actuated to cause handler 36 to be raised, thereby lifting the finger supported coil from conveyor section 30. This permits another coil to travel across conveyor member 14 and discharge end 12 thereof onto conveyor section 30. This second coil will be stopped by beam 60 and located. Handler 36 is then lowered with the finger supported coil being stacked upon the second coil. Pressure switch 88 causes finger parts 40 and 42 to be withdrawn from supporting contact with the stacked coil as handler 36 is lowered. Once handler 36 has been disengaged from the stacked or upper coil, it is lowered until the finger parts 40 and 42 can engage the lower surface of the second or lower coil. Power cylinders 54 are then actuated to raise both coils to permit conveyor section 30 to be shifted from its loading into its discharge position. At this time, both coils are lowered by handler 36 onto turntable 18.

It is to be understood that the invention is not to be limited to the details above given, but may be modified within the scope of the appended claims.

What we claim is:

1. A transporting device for items of coiled material, said transporting device located at the discharge end of a conveyor member and over a depository means, said conveyor member used to transport said items individually to said discharge end thereof for handling by said transporting device, said transporting device comprising a frame member, a horizontal conveyor section carried upon said frame member above said depository means, handler means carried by said frame member and positioned over said depository means near said conveyor member discharge end, said frame member including guide means supporting said conveyor section for shiftable movement of said conveyor section in a generally horizontal plane between a first position wherein said conveyor section is located under said handler means and is operatively contiguous with said conveyor means discharge end to receive an item of coiled material from said conveyor member and a second position wherein said conveyor section is shifted from under said handler means and separated from said conveyor member discharge end to expose said depository means under said handler means, stop means for locating said item upon said conveyor section under said handler means as said item is received from said conveyor member by said conveyor section when said conveyor section is in its first position, said handler means for engaging said item when said item is located upon said conveyor section and being thereafter shiftable to a lower position so that said item can be lowered onto said depository means and into contact with a supporting means when said conveyor section is shifted into its second position or to an upper position so that said item is spaced above said conveyor section when said conveyor section remains in its first position.

2. The transporting device of claim 1 wherein said handler means engages said item when said item is located upon said conveyor section and raises said item from said conveyor section to permit the locating of a second of said items upon said conveyor section, said handler means for lowering said first mentioned item upon said second item and thereafter engaging said second item to lower both said first mentioned and second items onto said depository means after said conveyor section is shifted into its second position.

3. The transporting device of claim 1 wherein said handler means includes switch means for contacting said supporting means to cause the handler means to release said item.

4. The transporting device of claim 3 wherein said handler means includes pivotal finger means, said item having an open center, said finger means for engaging said item at its open center to lower said item into contact with said supporting means, said switch means carried by said finger means.

5. A transporting device for items of coiled material, said transporting device located at the discharge end of a conveyor member and over a depository means, said conveyor member used to transport said items individually to said discharge end thereof for handling by said transporting device, said transporting device comprising a frame member, a horizontal conveyor section carried upon said frame member above said depository means, handler means carried by said frame member and positioned over said depository means near said conveyor member discharge end, said frame member including guide means supporting said conveyor section for shiftable movement of said conveyor section in a generally horizontal plane between a first position wherein said conveyor section is located under said handler means and is operatively contiguous with said conveyor means discharge end to receive an item of coiled material from said conveyor member and a second position wherein said conveyor section is shifted from under said handler means and separated from said conveyor member discharge end to expose said depository means under said handler means, stop means for locating said item upon said conveyor section under said handler means as said item is received from said conveyor member by said conveyor section when said conveyor section is in its first position, said handler means for engaging said item when said item is located upon said conveyor section and to lower said item onto said depository means when said conveyor section is shifted into its second position, each item of coiled material having an inner diameter defining a center opening of said item, said stop means carried by said conveyor section and including contact means for engaging said item in its center opening at its inner diameter to locate said item upon said conveyor section under said handler means as said item travels from said conveyor member onto said conveyor section, said stop means including pivot beam means having a longitudinal dimension extending along the general direction of travel of said item over said conveyor section, said conveyor section having item-contacting support surfaces, said beam means located within said conveyor section adjacent said conveyor section support surfaces, means connecting said beam means to said conveyor section wherein said beam means is pivotal in its longitudinal dimension relative to said conveyor section about a transverse axis, said beam means having end portions located on opposite sides of said transverse pivot axis, one of said end portions located more closely to said conveyor member than the other of said end portions and carrying said contact means, said contact means being normally positioned below said conveyor section support surfaces with part of the other end portion of said beam means projecting above said support surfaces, said beam means being pivoted about its transverse pivot axis when said item in traveling over said support surfaces contacts said projecting part of the beam means other end portion to position said contact means above said support surfaces and within the center opening of said item.

6. The transporting device of claim 5 wherein said projecting part of the beam means other end portion is a yieldable spring means over which said item travels, said spring means having sufficient rigidity to cause said beam means to pivot about its transverse pivot axis and position said contact means within the center opening of said item.

7. The transporting device of claim 5 wherein said contact means is a pin projecting upwardly from said one end portion of the beam means.

8. The transporting device of claim 5 wherein said contact means is a pair of laterally spaced pins projecting upwardly from said one end portion of the beam means.

9. Apparatus for transporting items of open centered coiled material, said apparatus including a conveyor member having a discharge end and a turntable-type depository means rotatable about a vertical axis, a transporting device located at the discharge end of said conveyor member and over said depository means spaced from said axis of rotation thereof, said conveyor member used to transport said items individually to said discharge end thereof for handling by said transporting device, said transporting device including a frame member, a horizontal conveyor section carried upon said frame member above said depository means, handler means carried by said frame member and positioned over said depository means near said conveyor member discharge end, said frame member including guide means supporting said conveyor section for shiftable movement of said conveyor section in a generally horizontal plane toward said axis of rotation of the discharge means between a first position wherein said conveyor section is located under said handler means and is operatively contiguous with said conveyor means discharge end to receive an item of coiled material from said conveyor member and a second position wherein said conveyor section is shifted from under said handler means and separated longitudinally from said conveyor member discharge end to expose said depository means under said handler means, stop means for locating said item upon said conveyor section under said handler means as said item is received from said conveyor member by said conveyor section when said conveyor section is in its first position, said handler means for engaging said item when said item is located upon said conveyor section and being thereafter shiftable to a lower position so that said item can be lowered onto said depository means and into contact with a supporting means when said conveyor section is shifted into its second position or to an upper position so that said item is spaced above said conveyor section when said conveyor section remains in its first position.

* * * * *